No. 894,055. PATENTED JULY 21, 1908.
C. RODGERS.
AUTOMOBILE.
APPLICATION FILED DEC. 2, 1907.

2 SHEETS—SHEET 1.

Witnesses,
William Whaley
Carrie R. Ivy

Inventor,
Cowan Rodgers
By Cyrus Kehr
Attorney.

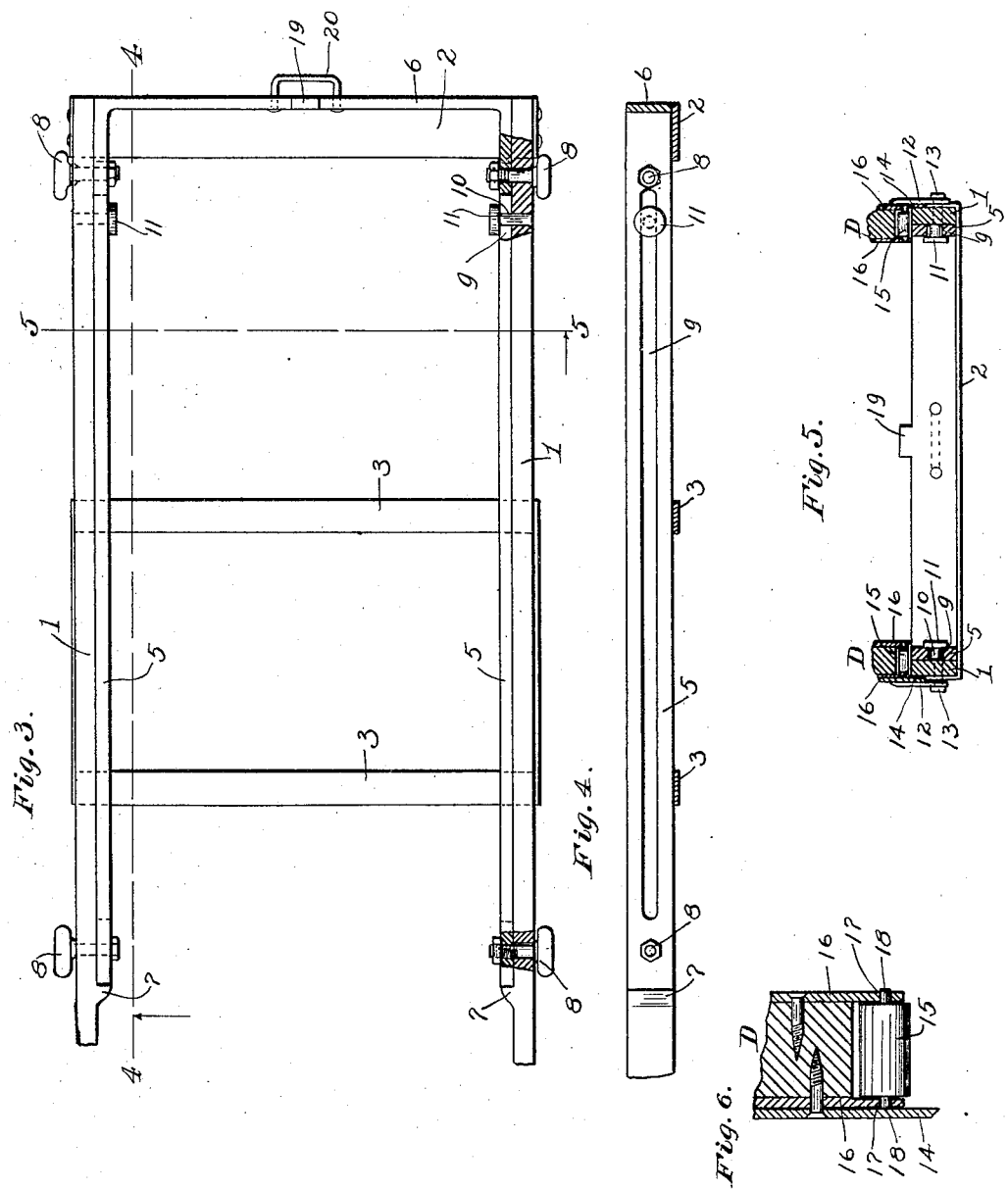

UNITED STATES PATENT OFFICE.

COWAN RODGERS, OF KNOXVILLE, TENNESSEE.

AUTOMOBILE.

No. 894,055.

Specification of Letters Patent.

Patented July 21, 1908.

Application filed December 2, 1907. Serial No. 404,773.

*To all whom it may concern:*

Be it known that I, COWAN RODGERS, a citizen of the United States, residing at Knoxville, in the county of Knox and State of Tennessee, have invented a new and useful Improvement in Automobiles, of which the following is a specification, reference being had to the accompanying drawing.

My improvement relates particularly to automobiles having a propelling engine or motor or other mechanism located below the body of the vehicle.

The object of the invention is to provide for the ready removal of the body of the vehicle from above such engine, motor, or other mechanism, and make such engine, motor, or other mechanism accessible for adjustment, repair, or removal. The improvement is specially advantageous for embodiment in automobiles in which the engine is located beneath the vehicle body approximately midway between the front and rear axles. Since the bodies of such automobiles are large and heavy, their removal for making such repairs and adjustments is a task ordinarily requiring the help of several men or of a lifting tackle. When the automobile is provided with my improvement, one man may remove such body from above such engine, motor, or other mechanism, whether the automobile be in a shop or on a distant country road.

Figure 1:
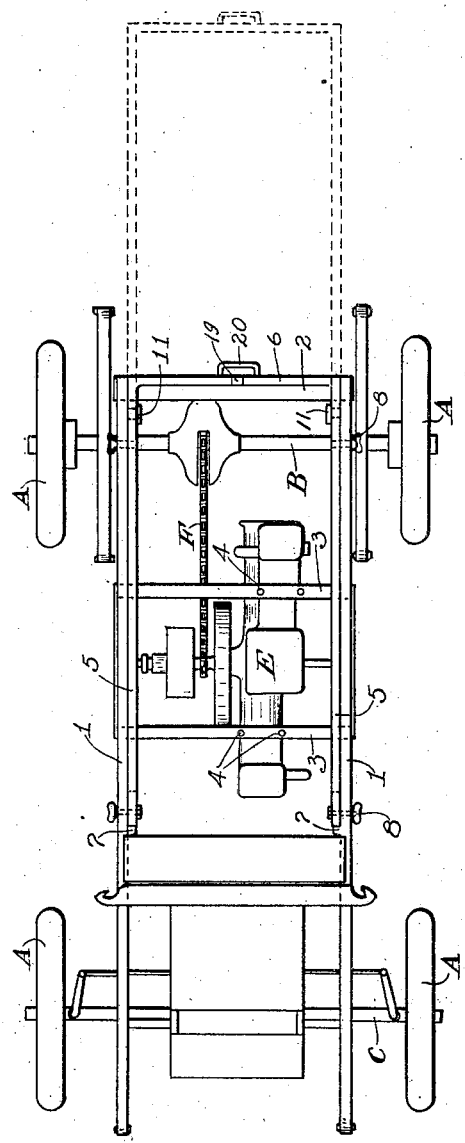
Figure 2:
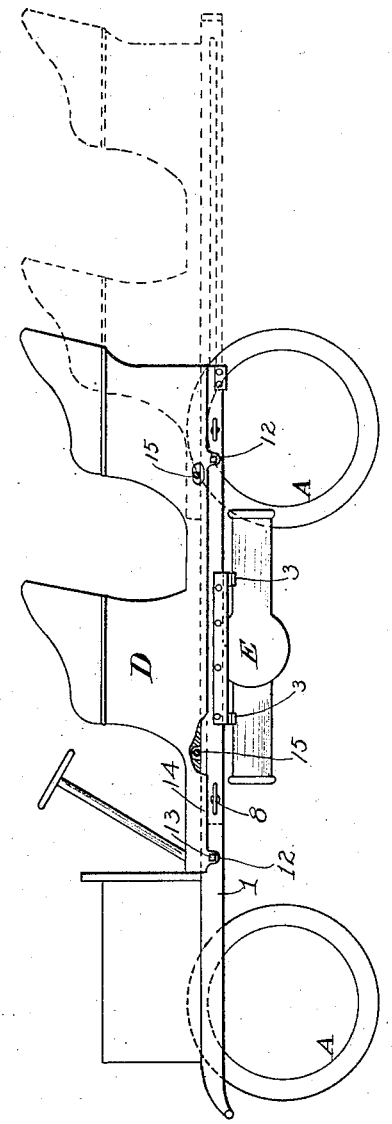

In the accompanying drawings, Figure 1 is a plan showing the running gear and framing of an automobile embodying my improvement; Fig. 2 is a side elevation of such an automobile, the body being in place thereon; Fig. 3 is a detail plan, partially in section, of the rear portion of the framing of the automobile; Fig. 4 is a section on the line 4—4 of Fig. 3, looking in the direction of the arrow; Fig. 5 is a section on the line 5—5 of Fig. 3, looking in the direction of the arrow; Fig. 6 is a sectional detail showing the manner of securing anti-friction rollers supporting the automobile body.

Referring to said drawings, A, A are the usual supporting wheels; B is the rear axle; C is the front axle or cross-beam; D is the body, and E is an engine connected by chain gearing, F, to the rear axle in any desired manner.

The body, D, is detachably supported upon the extensible frame to be next de-
scribed. Said body is of usual form, excepting that the base thereof is modified to adapt it to rest upon, be detachably secured to, and move upon said extensible frame. Said frame consists of a main, relatively stationary part and an auxiliary extension part or member, said auxiliary member being movable horizontally and rearward to form a support upon which and the main member of the frame the body, D, may be drawn rearward far enough to uncover the machinery located within or beneath the main member of said frame.

The main frame member comprises two horizontal parallel side beams or rails, 1, and a cross connecting bar, 2, secured by its ends to the rear ends of said rails, 1, beneath the latter, and two similar cross-bars, 3, extending beneath and joined to said side rails nearly midway between the ends of the latter. The engine, E, is suspended from said cross bars, 3, by means of bolts, 4. By placing said cross bars, 3 and 4, beneath said side rails, 1, 1, space is left for placing the auxiliary frame between said side rails and sliding said frame rearward between said rails.
Said auxiliary frame member, in the form shown in the drawings, comprises two side rails, 5, and a horizontal end piece, 6, joining the rear ends of said rails. Said side rails and said end piece may be integral or merely rigidly joined to each other in any desired manner. Said side rails normally rest closely against the inner face of the adjacent side rail, 1, the end piece, 6, being even or approximately even with the rear ends of the side rails, 1, and the front ends of the auxiliary side rails, 5, resting against lugs, 7, located upon the inner faces of the main side rails, 1, (see Figs. 1, 3, and 5); and the upper edges of the main side rails, 1, and the auxiliary side rails, 5, are preferably at the same level, while the lower faces of the auxiliary side rails fit closely upon the cross bar, 2. The auxiliary or extension frame member is normally secured to the main frame member by means of bolts, 8, extending horizontally through the rails, 1, and 5, near the front and rear ends of the latter, as shown in Fig. 3. After removing said bolts, the auxiliary member is free to be drawn rearward. For guiding said member or limiting it to movement in the plane of the main frame member, each side rail of the extension member is provided with a longitudinal, horizontal slot, 9, through which extends a wrist, 10, having on its inner end a head, 11, wider than said slot and adapted to engage the inner face of the side rail, 5. When the side rails, 5, move, said wrists and said heads prevent the front ends of the auxiliary rails from rising, and the cross-bar, 2, prevents said rails from descending to any material extent.

The body, D, is placed flatwise upon the frame, when the latter is in the closed position and the extension member secured by the bolts, 8. Ears, 12, extend downward from the body over the outer upright face of each of the main side rails, 1, and bolts, 13, extend horizontally through said ears and into the adjacent side rail, 1.

In addition to the ears, 12, the body, D, is shown in the drawings as having a flange, 14, extending downward a little way over the outer face of each side rail, 1. Said ears and said flange both serve to prevent lateral movement of the body when the latter is in its normal position and they also serve as guides to keep said body on the frame (on both the main member and the extension member) while the body is being moved rearward or forward on said frame.

The body may rest slidably upon said frame (after the binding bolts, 13, have been released); but it is preferable to place antifriction rollers, 15, between said body and said frame. Said rollers may be secured or confined in any suitable manner whereby they will support the body, D, when it is being moved forward or backward. In the form shown in the drawings (Figs. 5 and 6), the rollers are located between plates, 16, reaching downward from the body, D, and having horizontal bearings, 17, in which the journals, 18, rest. Each of said rollers is long enough to extend across the upper face of the adjacent side rails, 1 and 5, so that when the extension member has been drawn rearward, said rollers will have support upon the main frame member, and so that when the body is thereafter drawn rearward, said rollers will have support upon said extension member side rails.

Upon the upper edge of the end piece, 6, of the auxiliary frame member is a stop, 19, which serves as a limit for the rearward movement of the body, D. On the rear face of said end piece, 6, is a handle, 20, which is to be grasped for drawing the auxiliary frame rearward.

When the body is to be removed from its normal position to expose the engine, E, or other mechanism, located below said body, the bolts, 8, are loosened so as to release the extension frame member from the main frame member. Then the extension member is drawn rearward as far as the wrist, 10, will permit. In this position, said two members form an extended frame, the side rails of which form a track upon which the body, D, may be run rearward. Said body is then released by releasing or detaching the bolts, 13. Then the body is pushed or pulled backward as far as desired upon the extended track so formed by the side rails of said frame members. When the adjustment or repairing of the engine or other mechanism made accessible by the removal of said body is completed, the body is returned and again secured to the frame.

I claim as my invention:

1. In an automobile, an extensible frame, and a body horizontally-movably mounted upon said frame.

2. In an automobile, an extensible frame, and a body supported by rollers upon said frame.

3. In an automobile, an extensible frame, a body mounted upon said frame and having means for limiting the body to back-and-forth movement upon said frame.

4. In an automobile, main side rails, auxiliary movable side rails, and a body movably resting upon said rails.

5. In an automobile, main side rails, auxiliary rearward movable side rails, and a body movably resting upon said rails.

6. In an automobile, an extensible frame, and a body releasably mounted upon and extending over the sides of said frame.

7. In an automobile, an extensible frame, a body releasably mounted upon and extending over the sides of said frame, and rollers interposed between said body and said frame.

8. In an automobile, a body, and an extensible frame horizontally-movably supporting said body and having a stop for limiting the movement of said body from its normal position.

9. In an automobile, a body, an extensible frame horizontally-movably supporting said body and having a stop for limiting the movement of said body from its normal position, and rollers interposed between said body and said frame.

10. In an automobile, a frame comprising a main member and an extension member located within said main member, and a body horizontally-movably mounted upon said frame.

11. In an automobile, a frame comprising a main member and an extension member located within said main member, a body horizontally-movably mounted upon said frame, and rollers interposed between said body and said frame.

12. In an automobile, a frame comprising a main member and an extension member located within said main member, and a body mounted upon and extending over the sides of said frame.

13. In an automobile, a frame comprising a main member and an extension member located within said main member, a body mounted upon and extending over the sides of said frame, and rollers interposed between said body and said frame.

14. In an automobile, a body having downward-extending members at each side, an extension frame supporting said body and having a stop for limiting the movement of said body from its normal position.

15. In an automobile, a body having downward-extending members at each side, an extension frame supporting said body and having a stop for limiting the movement of said body from its normal position, and rollers interposed between said body and said frame.

16. In an automobile, a main frame comprising side rails and cross-bars extending beneath said side rails, an extension member located between said side rails and above said cross-bars, and a body horizontally-movably mounted upon said frame.

17. In an automobile, main side rails, auxiliary movable side rails located beside said main side rails, a body movably resting upon said rails, and rollers located beneath each side of the body and extending over both said rails.

In testimony whereof I have signed my name, in presence of witnesses, this 29th day of November, in the year one thousand nine hundred and seven.

COWAN RODGERS.

Witnesses:
CYRUS KEHR,
W. S. MARFIELD,
R. E. MOONY.